US011489212B2

(12) United States Patent
Ha et al.

(10) Patent No.: US 11,489,212 B2
(45) Date of Patent: Nov. 1, 2022

(54) METHOD OF CONTROLLING PLURALITY OF BATTERIES AND ELECTRONIC DEVICE TO WHICH THE SAME IS APPLIED

(71) Applicant: Samsung Electronics Co., Ltd, Suwon-si (KR)

(72) Inventors: Youngmi Ha, Suwon-si (KR); Sungjoon Cho, Suwon-si (KR); Seungbeom Kang, Suwon-si (KR); Kyounghoon Kim, Suwon-si (KR); Duhyun Kim, Suwon-si (KR); Byungwook Kim, Suwon-si (KR); Jaeho Song, Suwon-si (KR); Dongik Sin, Suwon-si (KR); Hansol Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 16/747,381

(22) Filed: Jan. 20, 2020

(65) Prior Publication Data

US 2020/0266499 A1 Aug. 20, 2020

(30) Foreign Application Priority Data

Feb. 19, 2019 (KR) .......................... 10-2019-0019469

(51) Int. Cl.
*H01M 10/42* (2006.01)
*H01M 10/44* (2006.01)
(Continued)

(52) U.S. Cl.
CPC ..... *H01M 10/441* (2013.01); *H01M 10/4257* (2013.01); *H01M 50/20* (2021.01); *H02J 7/0071* (2020.01); *H01M 2010/4271* (2013.01)

(58) Field of Classification Search
CPC ............ H01M 10/441; H01M 10/4257; H01M 2010/4271; H01M 10/482; H01M 10/425;
(Continued)

(56) References Cited

U.S. PATENT DOCUMENTS 10,910,847 B2 *  2/2021  Grasshoff ............. H02J 7/0014
2007/0262748 A1 * 11/2007  Yamamoto ............. H02J 9/061
320/125
(Continued)

FOREIGN PATENT DOCUMENTS

JP       2011-130575 A       6/2011
JP       2014-115127 A       6/2014
(Continued)

OTHER PUBLICATIONS

International Search Report dated Apr. 24, 2020 in connection with International Patent Application No. PCT/KR2020/000234, 10 pages.

*Primary Examiner* — Nghia M Doan

(57) ABSTRACT

A method of controlling a plurality of batteries and an electronic device to which the same is applied. The electronic device includes a housing and a plurality of batteries. The electronic device also includes a power management module, a plurality of current limiting ICs, and a processor operationally connected to the plurality of batteries, the power management module and the plurality of current limiting ICs. The processor is configured to sense a sum of the currents flowing into the plurality of batteries or a voltage of the power management module, perform a primary end of reducing a magnitude of the sum of the currents flowing into the plurality of batteries, sense the currents or voltages of the plurality of batteries, and perform a secondary end of blocking a current flowing into a battery.

18 Claims, 11 Drawing Sheets

(51) Int. Cl.
*H02J 7/00* (2006.01)
*H01M 50/20* (2021.01)

(58) Field of Classification Search
CPC .... H01M 50/20; H02J 7/0071; H02J 2310/22; H02J 7/00714; H02J 7/00302; H02J 7/0014; H02J 7/0013; H02J 7/0018; Y02E 60/10
See application file for complete search history.

(56) References Cited

U.S. PATENT DOCUMENTS

| | | |
|---|---|---|
| 2018/0331564 A1 | 11/2018 | Song et al. |
| 2019/0006722 A1* | 1/2019 | Kim ................... H01M 10/486 |
| 2020/0251920 A1 | 8/2020 | Ha et al. |
| 2020/0266499 A1* | 8/2020 | Ha ........................ H02J 7/0013 |
| 2020/0266627 A1* | 8/2020 | Ha ...................... H02J 7/00718 |

FOREIGN PATENT DOCUMENTS

| | | | |
|---|---|---|---|
| JP | 2015-195653 A | 11/2015 | |
| KR | 10-2020-0094926 A | 8/2020 | |

* cited by examiner

METHOD OF CONTROLLING PLURALITY OF BATTERIES AND ELECTRONIC DEVICE TO WHICH THE SAME IS APPLIED

CROSS-REFERENCE TO RELATED APPLICATION

This application is based on and claims priority under 35 U.S.C. § 119 to Korean Patent Application No. 10-2019-0019469 filed on Feb. 19, 2019 in the Korean Intellectual Property Office, the disclosure of which is incorporated by reference herein its entirety.

BACKGROUND

1. Field

The disclosure relates to a method of controlling a plurality of batteries and a technology for implementing an electronic device to which the method is applied.

2. Description of Related Art

An electronic device may operate for a specified time by using a battery while being separated from an external power source. When the electronic device is connected to an external power source, the battery may be charged. When the electronic device is separated from the external power source, the battery may be discharged to operate the electronic device.

The electronic device may operate using a plurality of batteries. The electronic device may operate using power stored in at least one of the batteries. The battery levels of the plurality of batteries may vary individually.

A balancing operation may occur between a plurality of batteries of the electronic device to match the level of each battery. Current may flow from the higher level battery toward the lower level battery by the balancing operation.

The above information is presented as background information only to assist with an understanding of the disclosure. No determination has been made, and no assertion is made, as to whether any of the above might be applicable as prior art with regard to the disclosure.

SUMMARY

A power management circuit of a conventional electronic device may control the charging based on the sum of the charged amounts of a plurality of batteries or the charged amount of a specific battery. The power management circuit may not manage the charged amount of each of the plurality of batteries. It may not be easy for the power management circuit to control the charged amount or state of a battery other than a specific battery among the plurality of batteries.

For example, when charging is controlled based on the sum of charged amounts or when an end operation is performed based on a specific battery, another battery may be overcharged after being fully charged. An overcharged battery may generate heat, swelling, and/or be damaged.

As another example, when the charging is controlled based on the sum of the charged amounts or the end operation is performed based on a specific battery, another battery may not be fully charged after being fully charged. When there is a battery that is not fully charged, the user may lose time for which the electronic device is used.

In addition, the balancing operation may occur when a difference in voltage between a plurality of batteries occurs. When the balancing operation occurs, charging and/or discharging may proceed in each of the plurality of batteries. In the process of charging and/or discharging each of the plurality of batteries, power loss and/or degradation of the batteries may occur.

Aspects of the disclosure are to address at least the above-mentioned problems and/or disadvantages and to provide at least the advantages described below. Accordingly, an aspect of the disclosure is to provide a method of fully charging each of a plurality of batteries by individually controlling a charged amount or a charged state of each battery, and an electronic device to which the method is applied.

In accordance with an aspect of the disclosure, an electronic device includes a housing, a plurality of batteries arranged in the housing, a power management module that controls the plurality of batteries, a plurality of current limiting ICs that limits a maximum intensity of a current flowing into each of the plurality of batteries, and a processor operationally connected to the plurality of batteries, the power management module and the plurality of current limiting ICs, wherein the processor may sense a sum of the currents flowing into the plurality of batteries and/or a voltage of the power management module, perform a primary end of reducing a magnitude of the sum of the currents flowing into the plurality of batteries based on the sum of the currents flowing into the plurality of batteries and/or the voltage of the power management module, sense the currents and/or voltages of the plurality of batteries, and perform a secondary end of blocking a current flowing into a battery having a current equal to or greater than a specified current and/or a voltage equal to or greater than a specified voltage among the plurality of batteries.

In accordance with another aspect of the disclosure, an electronic device includes a housing, a plurality of batteries arranged in the housing, a power management module that controls the plurality of batteries, a plurality of current limiting ICs that limits a maximum intensity of a current flowing into each of the plurality of batteries, and a processor operationally connected to the plurality of batteries, the power management module and the plurality of current limiting ICs, wherein the processor may sense voltages of the plurality of batteries, respectively, and allow each of the plurality of batteries to be auxiliary-charged independently until each of the plurality of batteries reaches an auxiliary charging state.

In accordance with another aspect of the disclosure, an electronic device includes a housing, a plurality of batteries arranged in the housing, a power management module that controls the plurality of batteries, a plurality of current limiting ICs that limits a maximum intensity of a current flowing into each of the plurality of batteries, and a processor operationally connected to the plurality of batteries, the power management module and the plurality of current limiting ICs, wherein the processor may sense a voltage of each of the plurality of batteries, select one from the voltages of the plurality of batteries based on a first value that is a difference value between the voltages of the plurality of batteries and a second value that is a threshold voltage, determine whether the selected voltage has a value less than an auxiliary charging voltage, and perform auxiliary charging when the selected voltage is less than the auxiliary charging voltage.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to description of drawings, similar elements may be marked by similar reference numerals.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
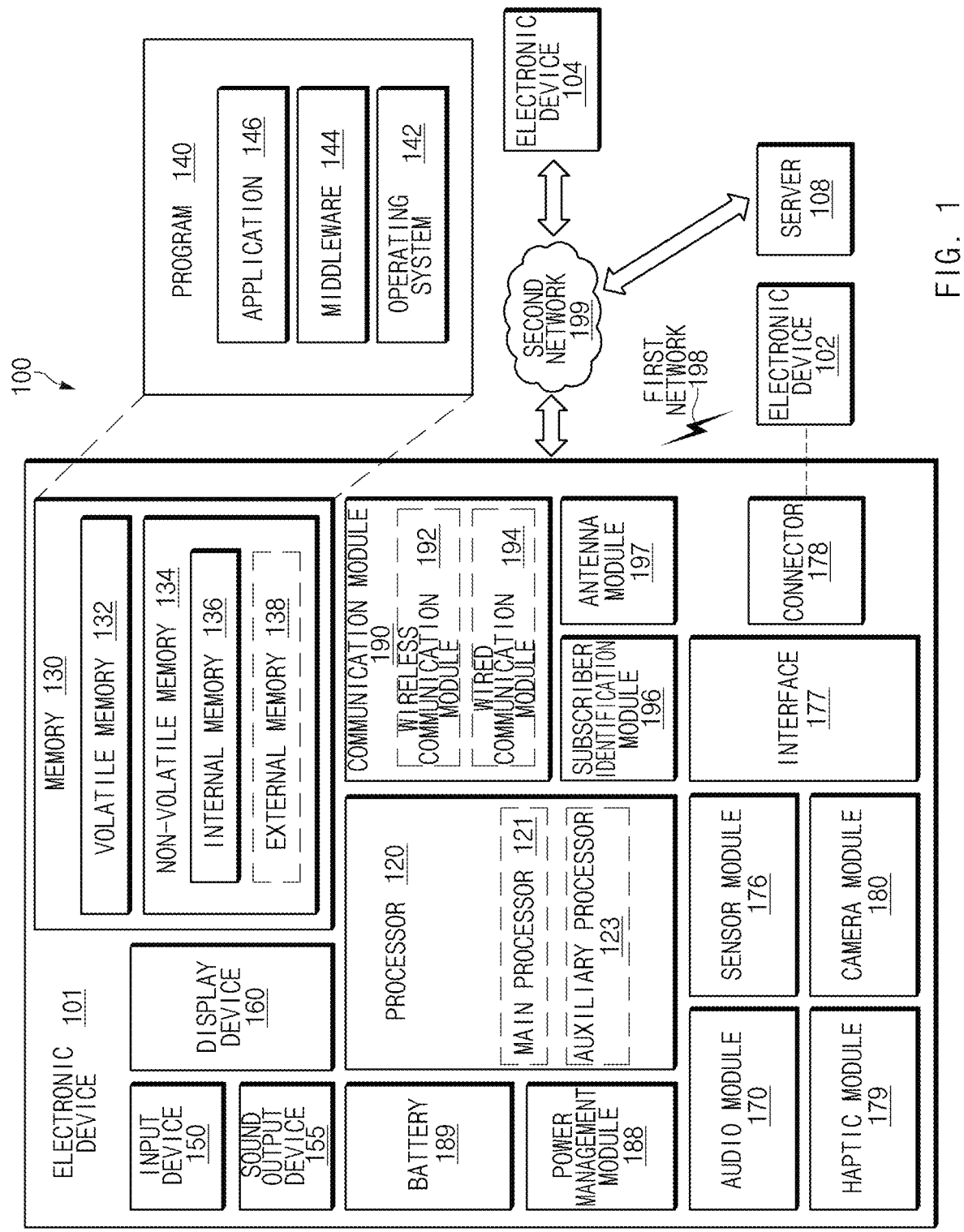
FIG. 1 illustrates a block diagram illustrating of electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
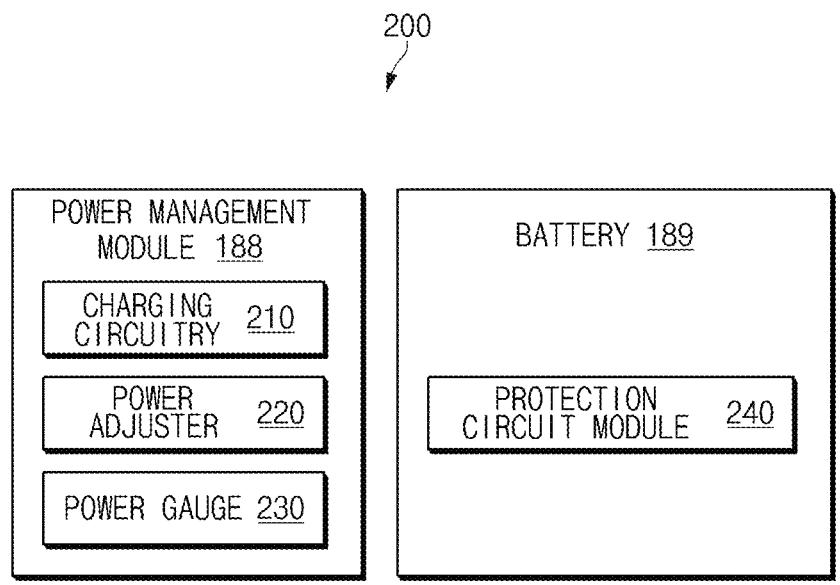
FIG. 2 illustrates a block diagram of the power management module and the battery according to various embodiments.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
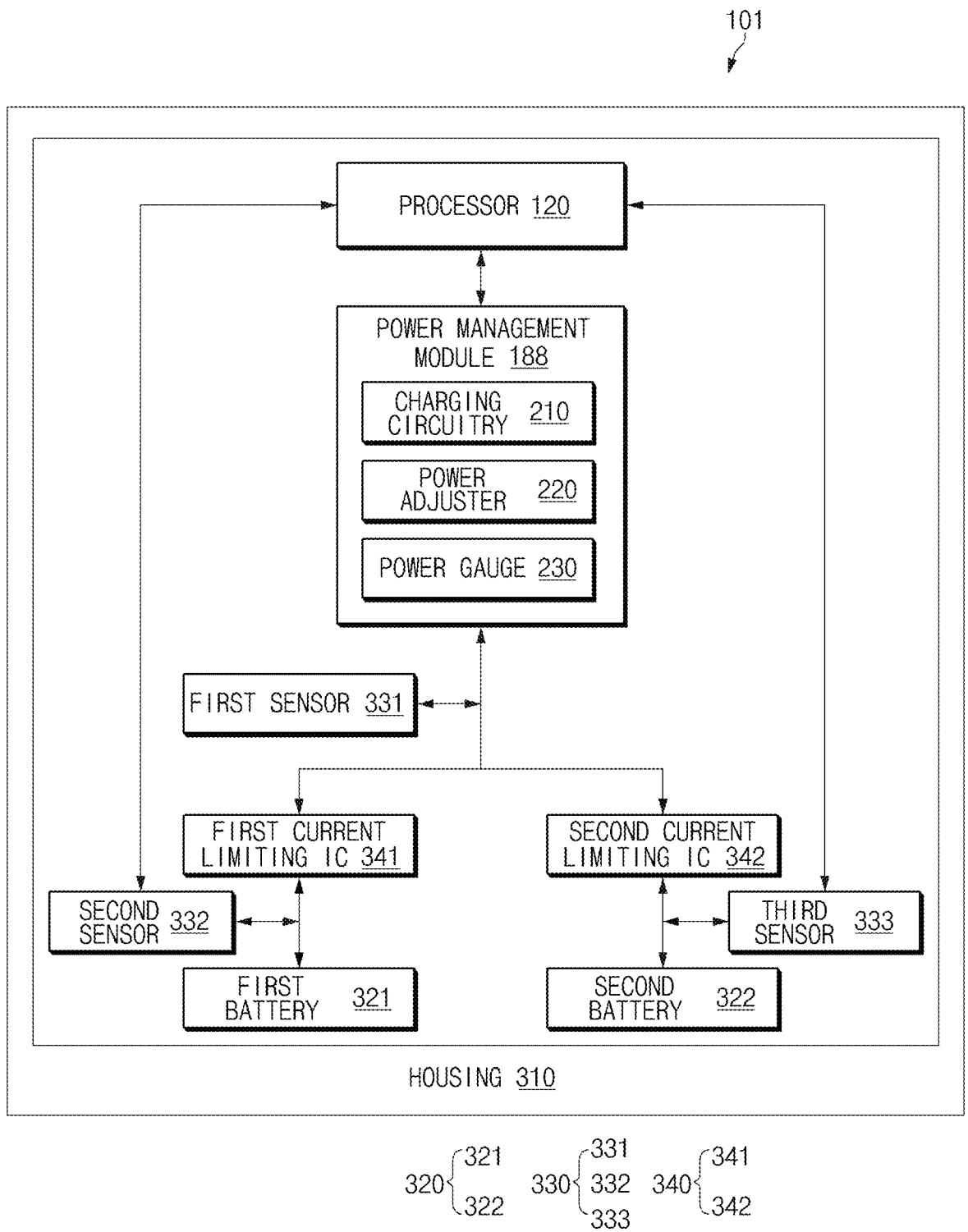
FIG. 3 illustrates a block diagram of an electronic device according to an embodiment.

FIG. 3 illustrates a block diagram of the electronic device 101 according to an embodiment.

Referring to FIG. 3, in an embodiment, the electronic device 101 (e.g., the electronic device 101 of FIG. 1) may include a plurality of batteries 320 and the power management module 188, a plurality of sensors 330, a plurality of current limiting ICs 340, and the processor 120, which are arranged in a housing 310.

In an embodiment, the housing 310 may define the appearance of the electronic device 101. The housing 310 may include a front plate that forms a front or first surface of the electronic device 101, a back plate that forms a back or second surface of the electronic device 101, and a side member that surrounds a space between the front plate and the back plate. The housing 310 may protect the plurality of batteries 320, the power management module 188, the plurality of sensors 330, the plurality of current limiting ICs 340, and the processor 120 from an external shock.

In an embodiment, the plurality of batteries 320 may be arranged in the housing 310. The plurality of batteries 320 may include a first battery 321 and a second battery 322. However, the embodiment is not limited thereto, and the plurality of batteries 320 may include three or more batteries. In this case, the electronic device 101 may operate as a multi-battery.

In an embodiment, each of the first and second batteries 321 and 322 may independently supply power required to operate the electronic device 101. Each of the first and second batteries 321 and 322 may be independently charged. Each of the first and second batteries 321 and 322 may have a different capacity. For example, the first battery 321 may be a main battery, and the second battery 322 may be a sub battery. Each of the first and second batteries 321 and 322 may be discharged at different rates.

In an embodiment, the first and second batteries 321 and 322 may perform a balancing operation to match the battery levels of each other. When the first and second batteries 321 and 322 perform the balancing operation, a difference in battery level between the first and second batteries 321 and 322 may be reduced.

In an embodiment, the power management module 188 may include a charging circuitry 210, a power adjuster 220, and the power gauge 230. The power management module 188 may be implemented as a power management integrated circuit (PMIC). The power management module 188 may control the plurality of batteries 320. For example, the power management module 188 may control the battery level of each of the first and second batteries 321 and 322. The power management module 188 may control the charging and/or discharging of each of the first and second batteries 321 and 322 to control the battery level of each of the first and second batteries 321 and 322. The power management module 188 may control the charging and/or discharging of each of the first and second batteries 321 and 322 by using the plurality of current limiting ICs 340.

In an embodiment, the plurality of sensors 330 may measure the current flowing through a specified portion and/or the voltage of a specified portion. The plurality of sensors 330 may include first to third sensors 331, 332 and 333.

In an embodiment, the plurality of current limiting ICs 340 may control the currents flowing into the plurality of batteries 320. The plurality of current limiting ICs 340 may limit the maximum intensity of the current flowing into each of the plurality of batteries 320. The plurality of current limiting ICs 340 may include a first current limiting IC 341 and a second current limiting IC 342. However, the disclosure is not limited thereto, and when the electronic device 101 operates with a multi-battery, the plurality of current limiting ICs 340 may include three or more current limiting ICs.

In an embodiment, the first sensor 331 may measure the total sum of the currents flowing from the power management module 188 to the plurality of batteries 320 and the total voltage of the plurality of batteries 320. FIG. 3 illustrates a case where the first sensor 331 is separately arranged. However, the disclosure is not limited thereto, and the first sensor 331 may be included in the power gauge 230. In this case, the power gauge 230 may measure the total sum of currents flowing into the plurality of batteries 320 and the total voltage of the plurality of batteries 320.

In an embodiment, the second sensor 332 may measure the current flowing into the first battery 321 and the voltage of the first battery 321. FIG. 3 illustrates a case where the second sensor 332 is separately arranged. However, the disclosure is not limited thereto, and the second sensor 332 may be included in the first current limiting IC 341. In this case, the first current limiting IC 341 may measure the current flowing into the first battery 321 and the voltage of the first battery 321.

In an embodiment, the third sensor 333 may measure the current flowing into the second battery 322 and the voltage of the second battery 322. FIG. 3 illustrates a case where the third sensor 333 is separately arranged. However, the disclosure is not limited thereto, and the third sensor 333 may be included in the second current limiting IC 342. In this case, the second current limiting IC 342 may measure the current flowing into the second battery 322 and the voltage of the second battery 322.

In an embodiment, the first current limiting IC 341 may limit the current flowing into the first battery 321. The first current limiting IC 341 may set the first battery 321 to a charging state or a discharging state. The first current limiting IC 341 may limit the maximum intensity of the current flowing from the power management module 188 into the first battery 321 in the charging state. The first current limiting IC 341 may limit the balancing operation between the first and second batteries 321 and 322 in the charging state. The first current limiting IC 341 may transmit, to the processor 120, information about the voltage of the first battery 321, the charging current flowing into the first battery 321, and/or the discharging current output from the first battery 321.

In an embodiment, the second current limiting IC 342 may limit the current flowing into the second battery 322. The second current limiting IC 342 may set the second battery 322 to a charging state or a discharging state. The second current limiting IC 342 may limit the maximum intensity of the current flowing from the power management module 188 into the second battery 322 in the charging state. The second current limiting IC 342 may limit the balancing operation between the first and second batteries 321 and 322 in the charging state. The second current limiting IC 342 may transmit, to the processor 120, information about the voltage of the second battery 322, the charging current flowing into the second battery 322, and/or the discharging current output from the second battery 322.

In an embodiment, the processor 120 is operationally connected to the plurality of batteries 320, the power management module 188, the plurality of temperature sensors 330, and the plurality of current limiting ICs 340. The processor 120 may obtain information about the plurality of batteries 320 through the charging circuitry 210 and the power gauge 230 of the power management module 188. For example, the processor 120 may know information about the sum of battery voltages, charging currents, discharging currents, and/or battery levels of the first and second batteries 321 and 322. The processor 120 may set the maximum intensities of the charging currents flowing into the first and second batteries 321 and 322 and/or whether to block the charging current.

In an embodiment, in the electronic device 101 to which a multi-battery structure is applied, each battery may be independently charged in a parallel structure, thereby causing a difference in charging time between batteries.

Figure 4:
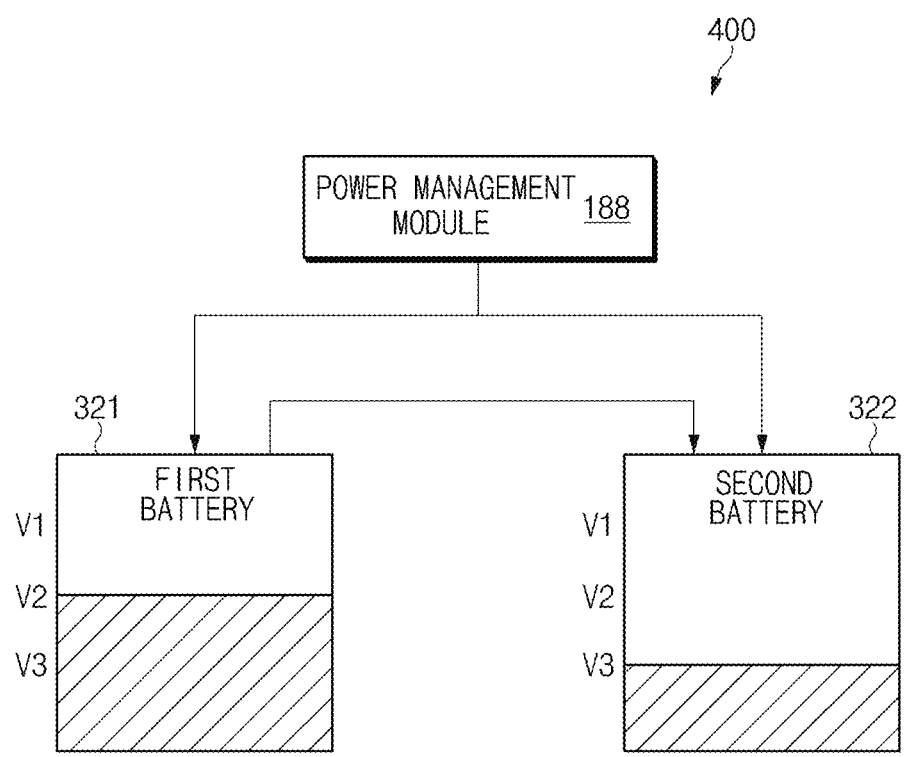
FIG. 4 illustrates a view diagram of charging of the first and second batteries according to an embodiment.

FIG. 4 illustrates a view diagram 400 of charging of the first and second batteries 321 and 322 according to an embodiment.

In an embodiment, the first and second batteries 321 and 322 may have a voltage lower than a first voltage V1, which is a fully charged voltage. The power management module 188 may set both the first and second batteries 321 and 322 to the charging state. The power management module 188 may allow charging currents to flow into the first and second batteries 321 and 322.

In an embodiment, the power management module 188 may set the sum of the charging current flowing from the charging circuitry 210 to the first battery 321 and the charging current flowing from the charging circuitry 210 into the second battery 322 to charge the first and second batteries 321 and 322. The charging currents flowing into the first and second batteries 321 and 322 may vary depending on the battery capacities. The sum of the charging currents into the first and second batteries 321 and 322 may be the sum of the charging maximum setting current flowing into the first battery 321 and the charging maximum setting current flowing into the second battery 322.

In an embodiment, the power management module 188 may set the charging currents based on the capacities of the first and second batteries 321 and 322. The power management module 188 may set the charging currents to less than or equal to the maximum currents allowed by the first and second batteries 321 and 322. The power management module 188 may set the charging currents such that the first and second batteries 321 and 322 are fully charged substantially at the same time.

In an embodiment, a voltage difference may occur between the first and second batteries 321 and 322. According to an impedance state of each of the first and second batteries 321 and 322, the charging currents and the discharging currents of the first and second batteries 321 and 322 may be different from each other. For example, the first battery 321 may have a second voltage V2 lower than the first voltage V1, and the second battery 322 may have a third voltage V3 lower than the second voltage V2.

In an embodiment, current may flow from the first battery 321 having the second voltage V2 to the second battery 322 having the third voltage V3. Because the current flows from the first battery 321 having a high voltage to the second battery 322 having a low voltage, the battery cell balancing may occur in which the second battery 322 is charged and the first battery 321 is discharged. As the voltage difference between the first and second batteries 321 and 322 increases, the battery cell balancing may increase. When the battery cell balancing occurs between the first and second batteries 321 and 322, the lifespans of the first and second batteries 321 and 322 may be reduced, or the first battery 321 and the second battery 322 may deteriorate.

Figure 5:
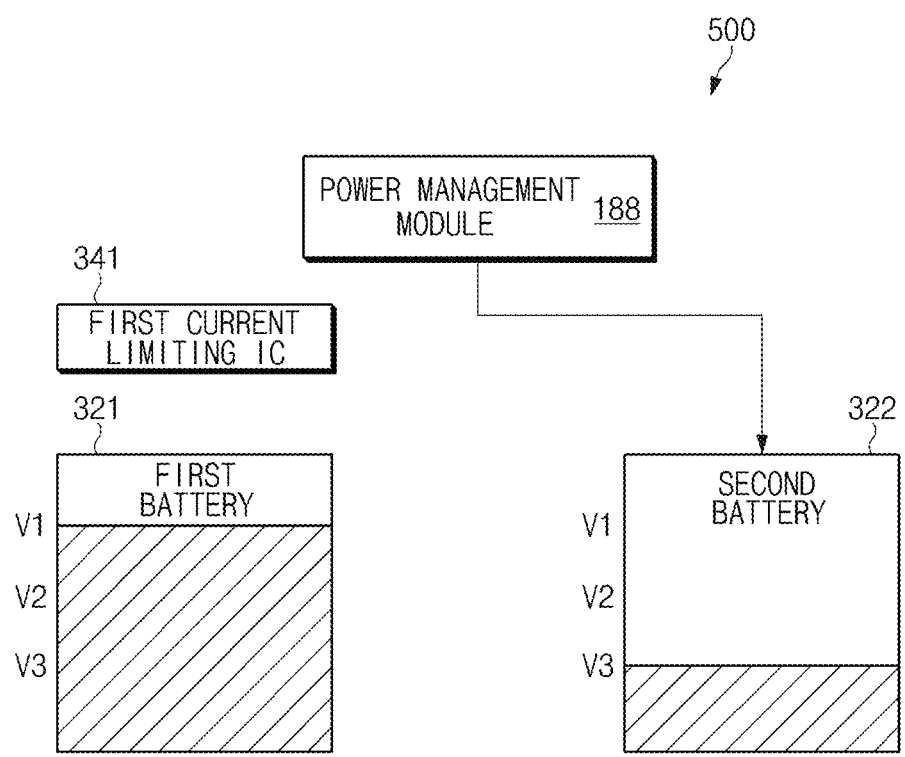
FIG. 5 illustrates a view of the blocking of the charging of the first battery and the charging of the second battery according to an embodiment.

FIG. 5 illustrates a view 500 of the blocking of the charging of the first battery 321 and the charging of the second battery 322 according to an embodiment.

In an embodiment, the first battery 321 may have the first voltage V1 that is a fully charged voltage. The second battery 322 may have the third voltage V3 lower than the first voltage V1. The first battery 321 may be in the fully charged state in which the voltage of the first battery 321 reaches the first voltage V1, which is the fully charged voltage, and the inflow of the charging current is blocked so that the first battery 321 is not charged. The second battery 322 may be in a charging state in which the second battery 322 has the third voltage V3 lower than the first voltage V1 which is the fully charged voltage, so that a charging current is introduced. The power management module 188 may set the first battery 321 to the fully charged state and set the second battery 322 to the charging state. The power management module 188 may prevent the charging current from flowing into the first battery 321 and introduce the charging current into the second battery 322. For example, the power management module 188 may prevent the charging current from flowing into the first battery 321 by using the first current limiting IC 341. The power management module 188 may process the first battery 321 with an end of current (EoC).

In an embodiment, the sum of the currents flowing into the first and second batteries 321 and 322 and the charging current flowing into the first battery 321 may be checked to end-process the first battery 321. The power management module 188 may perform a primary end of reducing the intensity of the current supplied from the power management module 188 based on the sum of the currents flowing into the first and second batteries 321 and 322. The first current limiting IC 341 may perform a secondary end of blocking the current flowing into the first battery 321 based on the charging current flowing into the first battery 321.

In an embodiment, the battery cell balancing may be prevented when the secondary end is performed. When the battery cell balancing is prevented, the lifespan of the first and second batteries 321 and 322 may be increased, and the first and second batteries 321 and 322 may be prevented from deteriorating.

Figure 6:
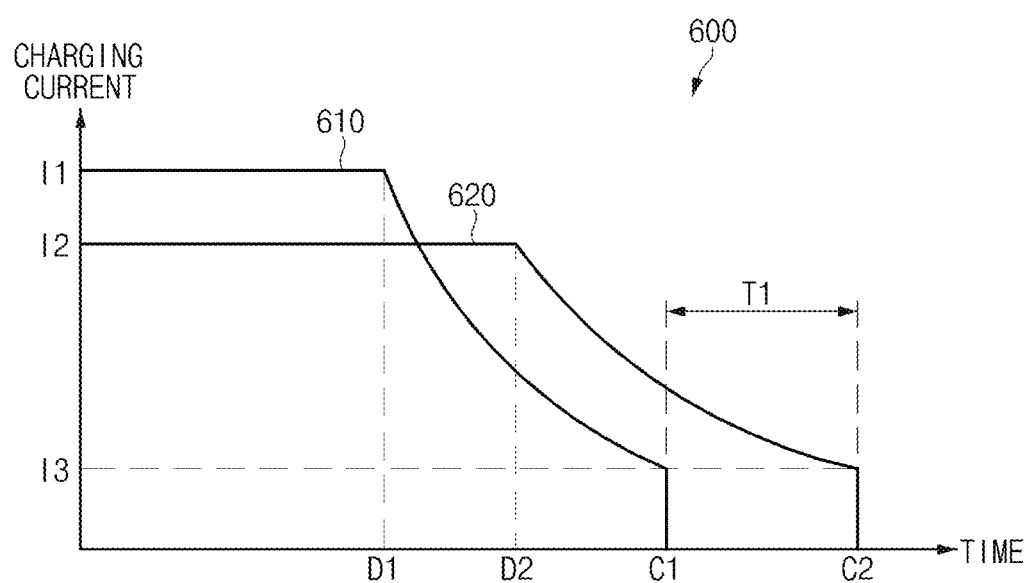
FIG. 6 illustrates a graph of charging currents of a first battery and a second battery according to an embodiment.

FIG. 6 illustrates a graph 600 of charging currents I1 and I2 of a first battery (e.g., the first battery 321 of FIG. 3) and a second battery (e.g., the second battery 322 of FIG. 3) according to an embodiment.

Conventionally, when the first and second batteries 321 and 322 are fully charged based on the sum of the charging currents of the first and second batteries 321 and 322, the primary end may be performed to block the current from an external power source (e.g., the external power source of FIG. 3). When the voltages and currents of the first and second batteries 321 and 322 are managed by adding up, the first battery 321 which is rapidly charged may be overcharged or the second battery 322 which is slowly charged may be undercharged at the time point when the first end is performed. Accordingly, it may be difficult to manage both the first and second batteries 321 and 322 to be stably and efficiently charged.

In addition, when a multi-battery of an existing parallel structure is employed, battery cell balancing may occur to maintain a balance between the batteries. When overcharging occurs through battery cell balancing, the first battery 321 and/or the second battery 322 may be damaged.

In an embodiment, when the multi-battery of the parallel structure is employed to solve the existing problems, first and second current limiting ICs (e.g., the first and second current limiting ICs 341 and 342 of FIG. 3) that manage the first and second batteries 321 and 322, respectively have been added. The first and second current limiting ICs 341 and 342 may control the amount of charging current and the amount of discharging current of the first and second batteries 321 and 322, respectively.

In an embodiment, a processor (e.g., the processor 120 of FIG. 3) may independently control the charging current of each of the first and second batteries 321 and 322. For example, the processor 120 may control a first charging current 610, which is the charging current of the first battery 321, based on the voltage of the first battery 321, and may control a second charging current 620, which is the charging current of the second battery 322, based on the voltage of the second battery 322.

In an embodiment, when the processor 120 ends the first and second batteries 321 and 322, the processor 120 may be set to determine the end operation based on only an end condition of each of the first and second batteries 321 and 322. For example, the processor 120 starts to decrease the first charging current 610 at a first reduction time point D1 to perform a first end on the first battery 321, and decrease the second charging current 620 at a second reduction time point D2 different from the first reduction time point D1 to perform the first end on the second battery 322. As another example, the processor 120 may block the first charging current 610 at a first cut-off time point C1 to perform a second end on the first battery 321, and block the second charging current 620 at a second cut-off time point C2 different from the first cut-off time point C1 to perform the second end on the second battery 322.

In an embodiment, the first and second batteries 321 and 322 can be put into a termination current state independently through the first and second ends. Each battery meets the end condition such that the charging current from a charger is blocked and at the same time, the current flowing into the battery is blocked before entering the auxiliary charging stage to avoid balancing the batteries. Each of the first and second batteries 321 and 322 may be fully charged without loss of capacity. Because the first and second batteries 321 and 322 are separately managed by the power management module 188, overcharging may be prevented.

In an embodiment, when a first section T1 elapses after the first charging current 610 reaches the first cut-off time point C1, the second charging current 620 may reach the second cut-off time point C2. The processor 120 may be set to perform the second end on the remaining battery 322 when a specified time elapses after performing the second end on one battery 321 of the plurality of batteries 321 and 322.

Figure 7:
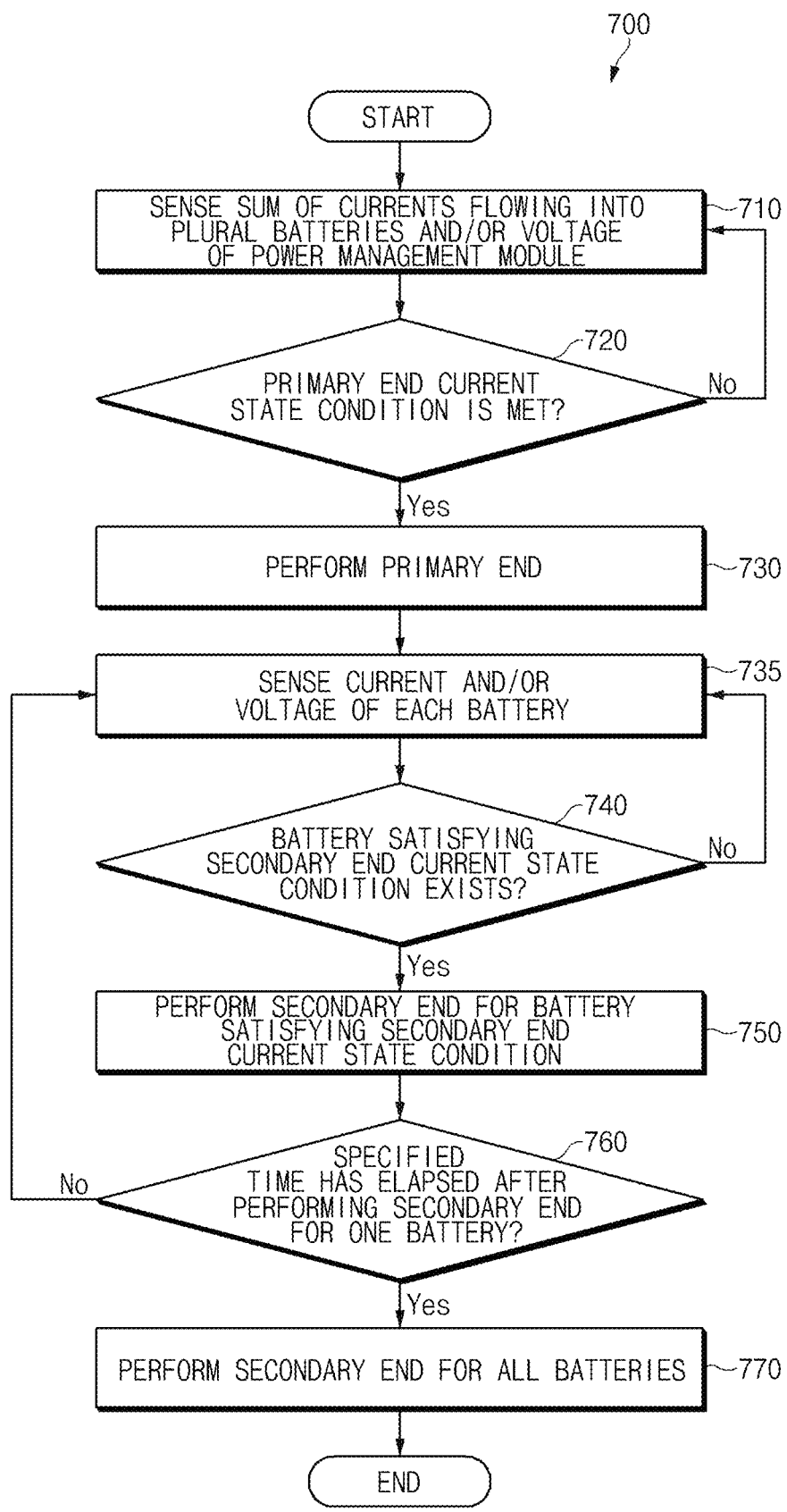
FIG. 7 illustrates a flowchart of a method of controlling a plurality of batteries of an electronic device according to an embodiment.

FIG. 7 illustrates a flowchart of a method of controlling a plurality of batteries (e.g., the first and second batteries 321 and 322 of FIG. 3) of an electronic device (e.g., the electronic device 101 of FIG. 3) according to an embodiment.

In operation 710, the electronic device 101 according to an embodiment may sense a sum of currents flowing into the plurality of batteries 321 and 322 and/or a voltage of the power management module 188. The electronic device 101 may use a first sensor (e.g., the first sensor 331 of FIG. 3) or the power management module 188 to sense the sum of the currents flowing into the first and second batteries 321 and 322. The electronic device 101 may use the first sensor 331 or the power management module 188 to sense voltages between the power management module 188 and the first and second batteries 321 and 322.

In operation 720, the electronic device 101 according to an embodiment may determine whether the primary end current state condition is satisfied. The condition for the primary end process may include a condition in which the sum of the currents flowing into the first and second batteries 321 and 322 is smaller than a specified current value. The condition for the primary end process may include a condition in which the voltage of the power management module 188 is greater than a specified voltage. When the primary end is processed by using the sum of the currents flowing into the first and second batteries 321 and 322, the primary end process may be performed more rapidly based on the sum of the currents flowing into the first and second batteries 321 and 322 than based on the first or second battery 321 or 322. In addition, the processor (e.g., the processor 120 of FIG. 3) may be set to perform the primary end process of the plurality of batteries 321 and 322 based on the sum of the charging currents of the plurality of batteries 321 and 322 and/or the voltages between the power management module 188 and the first and second batteries 321 and 322 in order to primarily inform the user of the fully charged state of the plurality of batteries 321 and 322.

In an embodiment, the processor 120 may proceed to operation 730 when any one battery (e.g., the first battery 321) satisfies the primary end current state condition in operation 720 (Yes). The processor 120 may repeat operation 710 when both the first and second batteries 321 and 322 do not satisfy the primary end current state condition in operation 720 (No).

In operation 730, the electronic device 101 according to an embodiment may perform the primary end.

In an embodiment, the power management module 188 may process the primary end when the primary end current state condition is met as the monitoring result of measuring the current and voltage between the power management module 188 and the first and second batteries 321 and 322. The power management module 188 may quickly perform the primary end based on the currents and voltages of the first and second batteries 321 and 322 measured at the current output end of the power management module 188.

In operation 735, the electronic device 101 according to an embodiment may sense the current and/or voltage of each of the batteries 321 and 322.

In an embodiment, the processor 120 may begin the secondary end algorithm after performing the primary end. The processor 120 may sense current and/or voltage of each of the plurality of batteries 321 and 322 in the second end algorithm. The processor 120 may be set to charge each of the plurality of batteries 321 and 322 to the full charging capacity in the secondary end algorithm. The processor 120 may perform charging until the current and voltage measured at each of the batteries 321 and 322 satisfy the secondary end condition.

In operation 740, the electronic device 101 according to an embodiment may determine whether a battery that satisfies the secondary end current state condition exists. The secondary end current state condition of the first battery 321 may include whether the current flowing into the first battery 321 has reached a fully charged state and/or whether the voltage of the first battery 321 has reached a fully charged voltage. The secondary end current state condition of the second battery 322 may include whether the current flowing into the second battery 322 has reached a fully charged state and/or whether the voltage of the second battery 322 has reached a fully charged voltage. When there is a battery that satisfies the secondary end current state condition, the processor 120 may perform operation 750 with respect to the battery that satisfies the secondary end current state condition. When no battery satisfies the secondary end current state condition, operation 735 may be repeated.

In operation 750, the electronic device 101 according to an embodiment may perform the secondary end on a battery that satisfies the secondary end current state condition. The processor 120 may completely block the charging currents flowing into the first battery 321 and/or the second battery 322 to prevent overcharging when the first battery 321 and/or the second battery 322 satisfies the secondary end current state condition. The processor 120 may use the first and second current limiting ICs (e.g., the first and second current limiting ICs 341 and 342 of FIG. 3) to block the currents flowing into the first battery 321 and/or the second battery 322. For example, the processor 120 may activate a supplemental mode of the first current limiting IC 341 to block all currents flowing into the first battery 321.

The electronic device 101 according to an embodiment may charge individually and fully all of the batteries 321 and 322 while preventing overcharging. The processor 120 may have an independent full charging logic for each battery in the multi-battery system. The processor 120 may minimize battery deterioration by preventing a specific battery from being overcharged and charged below capacity and minimizing battery cell balancing.

In operation 760, the electronic device 101 according to an embodiment may identify whether a specified time elapses after the secondary end of any one battery is performed. For example, when the first battery 321 first satisfies the secondary end current state condition, the processor 120 may perform the secondary end on the first battery 321 and proceed to charge the second battery 322. When the specified time elapses after the secondary end is performed on the first battery 321, the charging of the second battery 322 may be substantially completed. When it is not detected that the second battery 322 is fully charged, the secondary end may not be performed on the second battery 322.

In an embodiment, by using a timer after the end processing of the first battery 321, the processor 120 may identify whether a specified time elapses and whether the secondary end is performed on the second battery 322. When the specified time has not elapsed in operation 760 (No), the processor 120 returns to operation 735 to identify whether the second battery 322 meets the secondary end current state condition by sensing the current and/or voltage of the second battery 322. The processor 120 may proceed to operation 770 when the specified time has elapsed in operation 760 (Yes).

The electronic device 101 according to an embodiment of the disclosure may perform the secondary end for all batteries in operation 770. For example, when the secondary end for the second battery 322 is not performed until the specified time elapses after the secondary end for the first battery 321 is performed, the processor 120 may determine that the second battery 322 is fully charged and perform the secondary end. The processor 120 may specify the time until the supplemental mode of the second current limiting IC (e.g., the second current limiting IC 342) is activated after the supplemental mode of the first current limiting IC (e.g., the first current limiting IC 341) is activated. When the second current limiting IC 342 fails to operate in the supplemental mode within the specified time, the processor 120 may immediately perform the secondary end process as a time out process. The first and second current limiting ICs 341 and 342 may process the secondary end on the first and second batteries 321 and 322 by maintaining the supplemental mode activation state.

Figure 8:
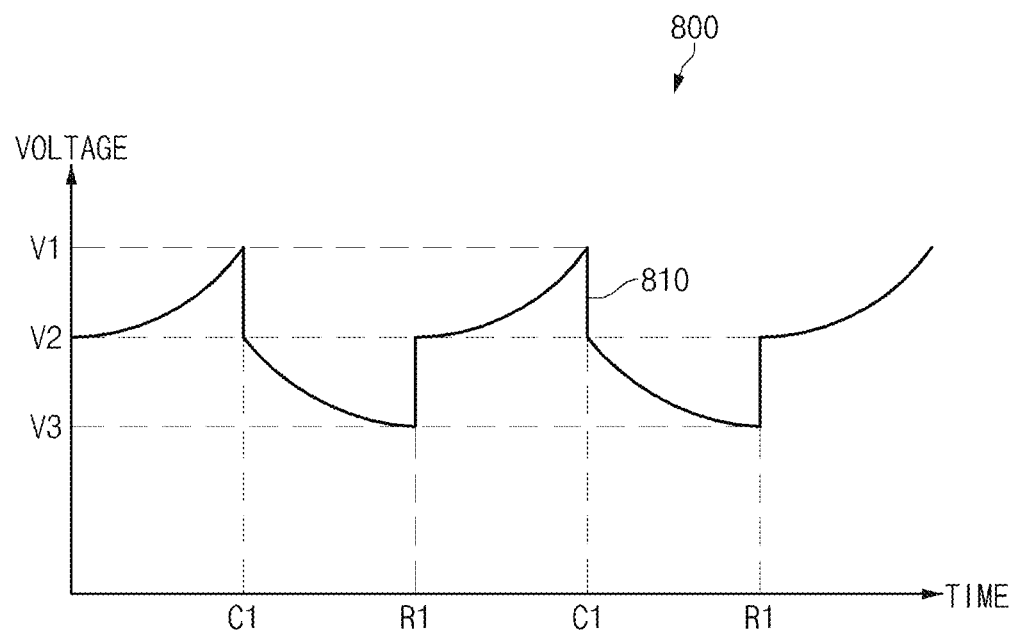
FIG. 8 illustrates a graph of an auxiliary charging process according to an embodiment.

FIG. 8 illustrates a graph 800 of a first auxiliary charging process 810 of a first battery (e.g., the first battery 321 of FIG. 3) according to an embodiment.

In an embodiment, recharging, under a specified condition, the first battery 321 of which the voltage is reduced after reaching a fully charged state is referred to as an auxiliary charge. After the first battery 321 reaches the fully charged state and the inflow of the charging current is blocked, the voltage of the first battery 321 may decrease as the first battery 321 is used. After the first battery 321 is subjected to the second end process, the first auxiliary charging process 810 may be performed.

In an embodiment, the first battery 321 may have the second voltage V2 lower than the first voltage V1, which is a fully charged voltage. The first battery 321 may be charged up to the first voltage V1 and may reach a fully charged state at the first cut-off time point C1 to block the inflow of the charging current. The voltage V1 of the first battery at the first cut-off time point C1 may decrease from the first voltage V1 to the second voltage V2. Although the charging current of the first battery 321 is blocked at the first cut-off time point C1, it may be difficult to rapidly change the current due to the capacitive component inside the first battery 321. As the voltage of the first battery 321 is used to rapidly change the current of the first battery 321, the voltage V1 of the first battery may decrease from the first voltage V1 to the second voltage V2. Alternatively, the battery voltage may be stabilized with the second voltage V2 smaller than the first voltage V1, which is a fully charged voltage of the electronic device (e.g., the electronic device 101 of FIG. 3). After the inflow of the charging current to the first battery 321 is blocked, the voltage of the first battery 321 may be reduced to a voltage smaller than the second voltage V2 due to the use of the first battery 321.

In an embodiment, when the voltage of the first battery 321 decreases and reaches the third voltage V3, the auxiliary charging may be performed at a first recharging time point R1. When the auxiliary charging is in progress, the voltage of the first battery 321 may increase again.

Figure 9:
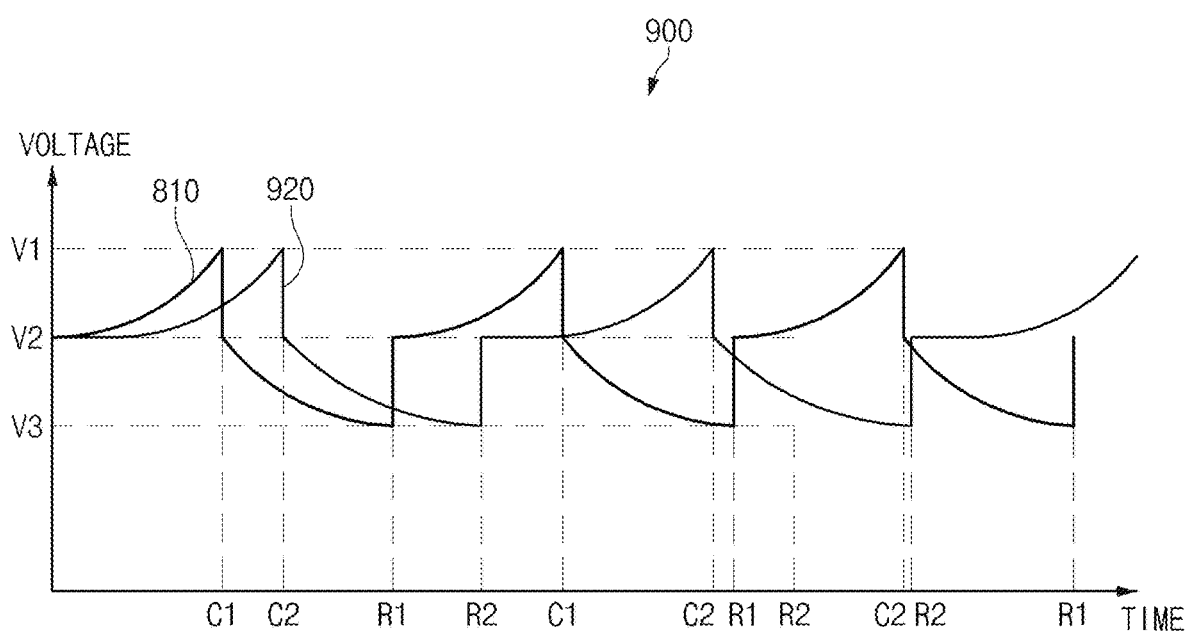
FIG. 9 illustrates a graph of a first auxiliary charging process of a first battery and a second auxiliary charging process of a second battery according to an embodiment.

FIG. 9 illustrates a graph of the first auxiliary charging process 810 of a first battery (e.g., the first battery 321 of FIG. 3) and a second auxiliary charging process 920 of a second battery (e.g., the second battery 322 of FIG. 3) according to an embodiment.

In an embodiment, in the multi-battery system, a difference in charging speed and/or discharging speed between the first and second batteries 321 and 322 may occur. The second battery 322 may have the second cut-off time point C2 and the second recharging time point R2 different from those in the first auxiliary charging process 810. For example, when the charging speed of the first battery 321 is faster than the charging speed of the second battery 322, the first cut-off time point C1 of the first auxiliary charging process 810 may be earlier than the second cut-off time point C2 of the second auxiliary charging process 920. As another example, when the discharging speed of the first battery 321 is faster than the discharging speed of the second battery 322, the first recharging time point R1 of the first auxiliary charging process 810 may be earlier than the second recharging time point R2 of the second auxiliary charging process 920.

In an embodiment, the first and second batteries 321 and 322 may have different secondary end time points. After the first and second batteries 321 and 322 are fully charged, the processor 120 may measure a voltage difference between the first and second batteries 321 and 322.

In an embodiment, the processor (e.g., the processor 120 of FIG. 3) may be set to allow the first and second batteries 321 and 322 to independently perform the auxiliary charging processes 810 and 920, respectively. The processor 120 may monitor the charging currents and/or battery voltages by using the second and third sensors (e.g., the second and third sensors 332 and 333 of FIG. 3) connected to the first and second batteries 321 and 322, respectively, or the first and second current limiting ICs (e.g., the first and second current limiting ICs 341 and 342 of FIG. 3). The processor 120 may determine whether the auxiliary charging condition is satisfied for each of the first and second batteries 321 and 322.

In an embodiment, the processor 120 may individually manage the first and second current limiting ICs 341 and 342 such that each of the first and second batteries 321 and 322 has an independent auxiliary charging cycle. The processor 120 may be set to independently perform the auxiliary charging based on the remaining capacity of each of the first and second batteries 321 and 322. The processor 120 may be set to perform auxiliary charging of each of the first and second batteries 321 and 322 without regard to the time elapsed after charging. The processor 120 may perform simultaneously or separately the auxiliary charging of the first and second batteries 321 and 322.

In an embodiment, the processor 120 may independently perform the first and second auxiliary charging processes 810 and 920. The full charging condition after the auxiliary charging has proceeded may be substantially the same as the full charging condition during charging. The processor 120 may use the second and third sensors 332 and 333 or the first and second current limiting ICs 341 and 342 to block the currents flowing into the first and second batteries 321 and 322. The processor 120 may fully charge each of the first and second batteries 321 and 322 without loss of capacity even when the secondary end time points of the first and second batteries 321 and 322 are different from each other. The processor 120 may prevent the first and second batteries 321 and 322 from being deteriorated due to the current flowing into the first and second batteries 321 and 322 by auxiliary charging.

In an embodiment, the processor 120 may block cell balancing from occurring while each of the first and second batteries 321 and 322 is discharged before reaching the auxiliary charging state. The processor 120 may block the currents flowing into the first and second batteries 321 and 322 by using the first and second current limiting ICs 341 and 342. The processor 120 may prevent overcharging due to cell balancing between the first and second batteries 321 and 322.

Figure 10:
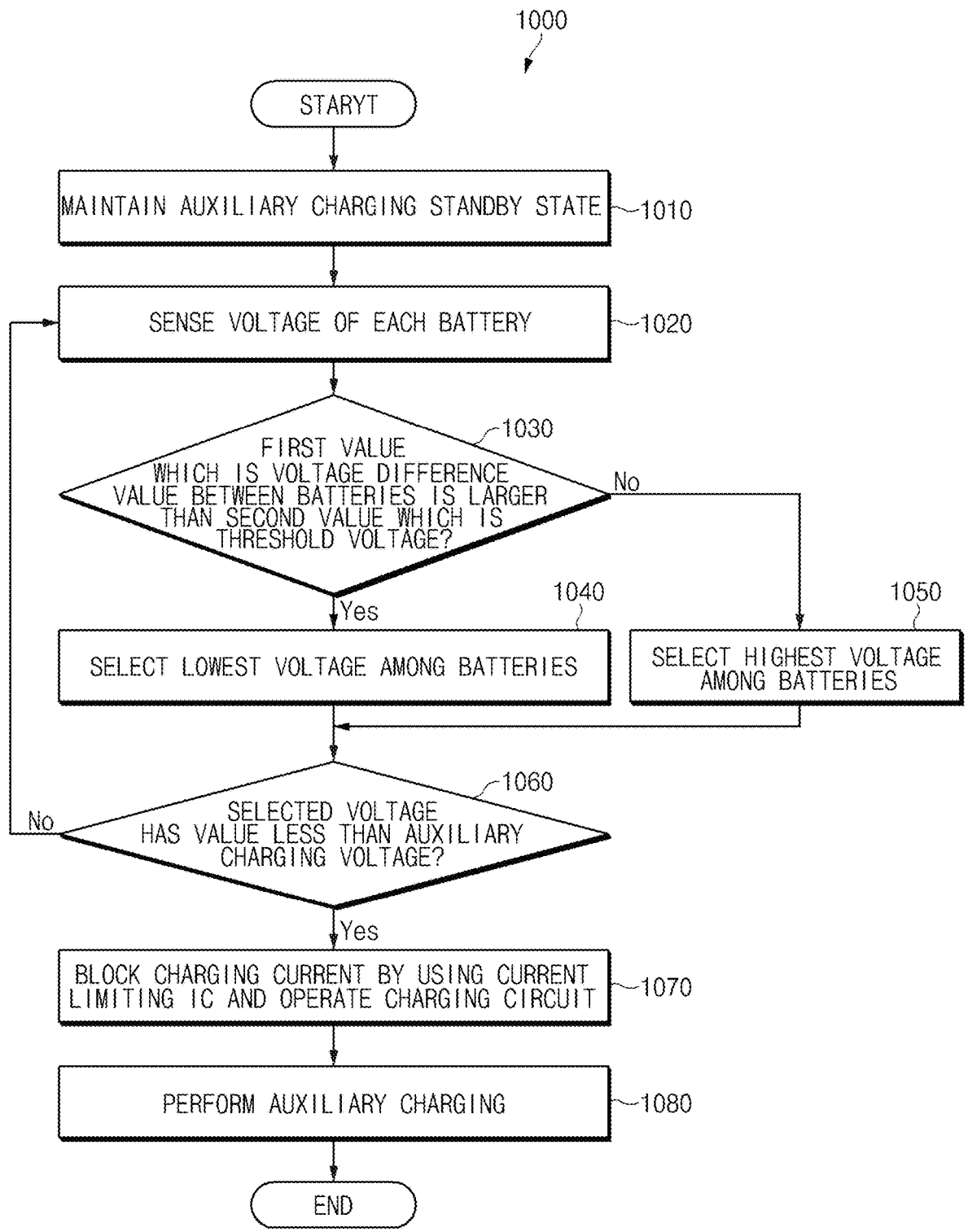
FIG. 10 illustrates a flowchart of an auxiliary charging process of a plurality of batteries according to an embodiment.

FIG. 10 illustrates a flowchart 1000 of an auxiliary charging process of a plurality of batteries (e.g., the first and second batteries 321 and 322 of FIG. 3) according to an embodiment.

In operation 1010, an electronic device (e.g., the electronic device 101 of FIG. 3) according to an embodiment may maintain an auxiliary charging standby state. The auxiliary charging standby state may be a state in which auxiliary charging is not performed. For example, the auxiliary charging standby state may be a state in which the plurality of batteries 321 and 322 are charged. As another example, the auxiliary charging standby state may be a state in which a voltage of each of the plurality of batteries 321 and 322 has a value greater than the auxiliary charging voltage (e.g., the third voltage V3 of FIG. 8) after being fully charged.

The electronic device 101 according to an embodiment may sense a voltage of each of the plurality of batteries 321 and 322 in operation 1020. The processor (e.g., the processor 120 of FIG. 3) may monitor the voltage of each of the plurality of batteries 321 and 322 by using the second and third sensors (e.g., the second and third sensors 332 and 333 of FIG. 3) or the first and second current limiting ICs (e.g., the first and second current limiting ICs 341 and 342 of FIG. 3) connected to the first and second batteries 321 and 322, respectively.

In operation 1030, the electronic device 101 according to an embodiment may identify whether a first value that is a difference value between voltages of the plurality of batteries 321 and 322 is greater than a second value that is a threshold voltage. When the first value is greater than the second value, the voltage of one battery (e.g., the second battery 322 of FIG. 3) is lower than a threshold value as compared to another battery (e.g., the first battery 321 of FIG. 3), so that the auxiliary charging is required to be performed immediately. When the first value is smaller than the second value, since the difference between the voltages of the plurality of batteries 321 and 322 is less than the threshold value, it may be preferable that no auxiliary charging is performed to prevent deterioration of the battery. When the first value is greater than the second value in operation 1030 (Yes), the processor 120 may go to operation 1040. When the first value is smaller than the second value in operation 1030 (Yes), the processor 120 may go to operation 1050.

In operation 1030, when the first value that is the difference value between the voltages of each of the plurality of batteries 321 and 322 is greater than the second value that is the threshold voltage, the processor 120 may be set to immediately perform auxiliary charging. In FIG. 10, a case of selecting a low voltage among the voltages of the plurality of batteries 321 and 322 is illustrated, but the embodiment is not limited thereto. The processor 120 may be set to reduce the voltage difference between the plurality of batteries 321 and 322 by immediately performing auxiliary charging when the voltage difference between the plurality of batteries 321 and 322 exceeds the threshold voltage.

The electronic device 101 according to an embodiment may select a lower voltage among voltages of the plurality of batteries 321 and 322 in operation 1040. When the difference between the voltages of the plurality of batteries 321 and 322 is greater than the threshold voltage, the processor 120 may be set to perform auxiliary charging as soon as possible. The processor 120 may perform auxiliary charging as soon as possible based on a lower voltage among the voltages of the plurality of batteries 321 and 322.

In operation 1050, the electronic device 101 according to an embodiment may select a higher voltage among the voltages of the plurality of batteries 321 and 322. When the difference between the voltages of the plurality of batteries 321 and 322 is lower than the threshold voltage, the processor 120 may be configured to perform auxiliary charging at the minimum. The processor 120 may minimally perform auxiliary charging based on a higher voltage among the voltages of the batteries 321 and 322.

In operation 1060, the electronic device 101 according to an embodiment may determine whether the selected voltage has a value smaller than the auxiliary charging voltage V3. The processor 120 may determine the start time point of auxiliary charging based on the selected voltage among the voltages of the plurality of batteries 321 and 322. The auxiliary charging may be entered based on a low voltage when the first value is greater than the second value or a higher voltage when the first value is less than the second value. The processor 120 may go to operation 1070 when the selected voltage has a value smaller than the auxiliary charging voltage V3 in operation 1060 (Yes). The processor 120 may repeat operation 1020 when the selected voltage has a value larger than the auxiliary charging voltage V3 in operation 1060 (No).

In operation 1070, the electronic device 101 according to an embodiment may block the charging current by using a current limiting IC (e.g., the first and second current limiting ICs 341 and 342 of FIG. 3) to prevent a cell balancing operation between the plurality of batteries 321 and 322 and operate a charging circuit (e.g., the charging circuitry 210 of FIG. 3). The processor 120 may be set to allow the plurality of batteries 321 and 322 to simultaneously enter auxiliary charging when the selected voltage has a value smaller than the auxiliary charging voltage V3.

The electronic device 101 according to an embodiment may perform auxiliary charging in operation 1080.

Figure 11:
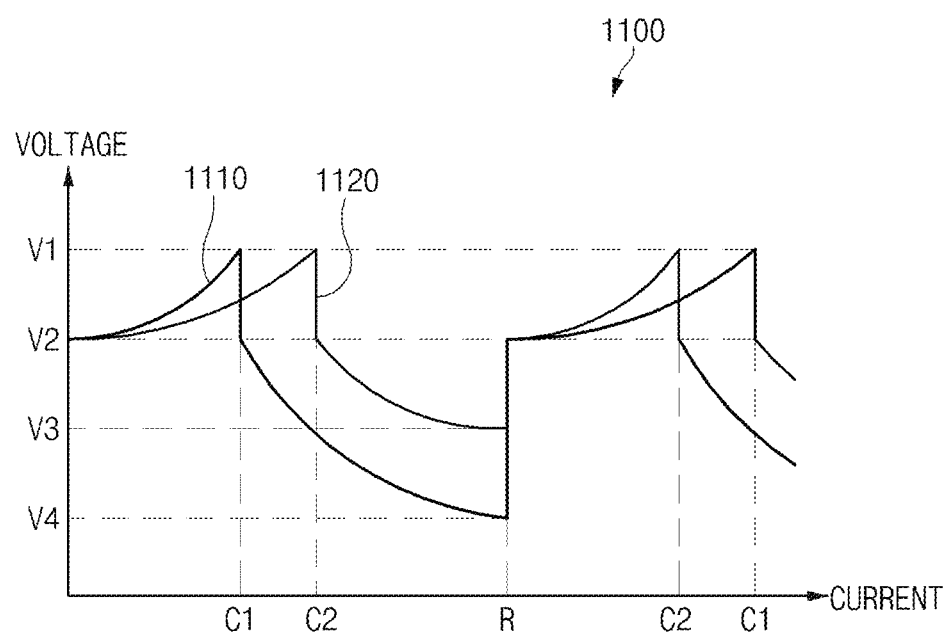
FIG. 11 illustrates a graph of a third auxiliary charging process of a first battery and a fourth auxiliary charging process of a second battery according to an embodiment.

FIG. 11 illustrates a graph 1100 of a third auxiliary charging process 1110 of a first battery (e.g., the first battery 321 of FIG. 3) and a fourth auxiliary charging process 1120 of a second battery (e.g., the second battery 322 of FIG. 3) according to an embodiment.

In an embodiment, the third and fourth auxiliary charging processes 1110 and 1120 may have the first and second cut-off time points C1 and C2 independent of each other. For example, when the charging speed of the first battery 321 is faster than the charging speed of the second battery 322, the first cut-off time point C1 is earlier than the second cut-off time point C2, and when the charging speed of the first battery 321 is slower than that of the second battery 322, the first cut-off time point C1 may be later than the second cut-off time point C2.

In an embodiment, the third and fourth auxiliary charging processes 1110 and 1120 may have the same recharging time point R. The recharging time point R may be a time point at which the selected voltage becomes smaller than the auxiliary charging voltage V3. The selected voltage may be a higher voltage among the voltages of the first and second batteries 321 and 322 when the difference between the voltages of the first and second batteries 321 and 322 is smaller than the threshold voltage. When the higher voltage among the voltages of the first and second batteries 321 and 322 is the selected voltage, the time point at which the voltage of the second battery 322 which is the higher voltage is smaller than the auxiliary charging voltage V3 may be set as the recharging time point R.

The electronic device 101 according to an embodiment may reduce the number of times of auxiliary charging in the multi-battery system if possible. The processor 120 may minimize battery deterioration due to frequent auxiliary charging and minimize battery deterioration by minimizing battery cell balancing by blocking current at an appropriate time point.

In an embodiment, in the multi-battery connection structure, the system power is maintained by the first battery 321 even when the connection of the second battery 322 of the first and second batteries 321 and 322 becomes poor or deteriorates. The user may not recognize a connection failure or degradation during use of the electronic device (e.g., the electronic device 101 of FIG. 3).

In an embodiment, when the connection of the second battery 322 is poor, the total available battery capacity may decrease. In order to detect a connection failure, when the connection state of each of the first and second batteries 321 and 322 is detected and identified to be in a bad state, the user may be informed of the bad state.

In an embodiment, the processor 120 may individually manage the deterioration state for each of the first and second batteries 321 and 322. For example, the processor 120 may accumulate the number of times of using each of the first and second batteries 321 and 322. The processor 120 may notify a user of a bad state when a specific battery among the first and second batteries 321 and 322 is defective or deteriorated.

In an embodiment, the processor 120 may monitor the voltage of each of the first and second batteries 321 and 322 every specified cycle. The processor 120 may be set to block charging when the first battery 321 and/or the second battery 322 are charged beyond the rated capacity. For example, when the intensities of the currents flowing into the first and second batteries 321 and 322 is equal to or greater than a specified value by comparing with the intensity of the current output from the power management module (e.g., the power management module 188 of FIG. 3), it may be determined that the charging state is bad. As another example, the processor 120 may determine that the charging state is bad when the voltage of the first battery 321 and/or the second battery 322 increases by a specified value or more. The processor 120 may individually detect various failures such as temperature, deterioration state, and connection failure for each of the first and second batteries 321 and 322 through a failure detection system in a multi-battery system and notify a specific bad state to a user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 101 or external memory 138) that is readable by a machine (e.g., the electronic device 101). For example, a processor (e.g., the processor 120) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, each of the plurality of batteries may be charged fully and independently to prevent overcharge and/or insufficient charging of a specific battery.

According to the embodiments of the disclosure, each of the plurality of batteries may be charged fully and independently to reduce the balancing operation between the batteries, thereby reducing power loss and/or battery degradation.

In addition, various effects that are directly or indirectly understood through the present disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a housing;
   a plurality of batteries arranged in the housing;
   a power management module configured to control the plurality of batteries;
   a plurality of current limiting ICs configured to limit a maximum intensity of a current flowing into each of the plurality of batteries; and
   a processor operationally connected to the plurality of batteries, the power management module and the plurality of current limiting ICs,
   wherein the processor is configured to:
   sense a sum of currents flowing into the plurality of batteries or a voltage of the power management module,
   perform a primary end of reducing a magnitude of the sum of the currents flowing into the plurality of batteries based on the sum of the currents flowing into the plurality of batteries or the voltage of the power management module,
   sense currents or voltages of the plurality of batteries, and
   perform a secondary end of blocking a current flowing into a battery having a current equal to or greater than a specified current or a voltage equal to or greater than a specified voltage among the plurality of batteries.

2. The electronic device of claim 1, wherein the processor is configured to:
   independently charge the battery before reaching an end current state before performing the secondary end among the plurality of batteries.

3. The electronic device of claim 1, wherein the processor is configured to:
   block cell balancing of the battery performing the secondary end by using a current limiting IC connected to the battery performing the secondary end among the plurality of batteries.

4. The electronic device of claim 1, wherein the processor is configured to:
   when a specified time elapses after the secondary end is performed on one of the plurality of batteries, perform the secondary end on remaining batteries.

5. The electronic device of claim 1, further comprising:
   a first sensor configured to sense the sum of the currents flowing into the plurality of batteries or the voltage of the power management module; and
   second and third sensors configured to sense the currents or the voltages of the plurality of batteries, respectively,
   wherein the processor is configured to:
   set a time point at which the primary end is to be performed by using the first sensor, and set a time point at which the secondary end is to be performed by using the second and third sensors.

6. The electronic device of claim 5, wherein the first sensor is included in the power management module,
wherein the second sensor is included in a first current limiting IC among the plurality of current limiting ICs, and
wherein the third sensor is included in a second current limiting IC among the plurality of current limiting ICs.

7. The electronic device of claim 1, wherein a condition for performing the primary end includes a condition in which the sum of the currents flowing into the plurality of batteries is greater than a specified current value.

8. The electronic device of claim 1, wherein a condition for performing the secondary end on a first battery of the plurality of batteries includes a condition of whether a current flowing into the first battery reaches a fully charged state or a condition of whether a voltage of the first battery reaches a fully charged voltage.

9. An electronic device comprising:
a housing;
a plurality of batteries arranged in the housing;
a power management module configured to control the plurality of batteries;
a plurality of current limiting ICs configured to limit a maximum intensity of a current flowing into each of the plurality of batteries; and
a processor operationally connected to the plurality of batteries, the power management module and the plurality of current limiting ICs,
wherein the processor is configured to:
sense voltages of the plurality of batteries, respectively, and
allow each of the plurality of batteries to be auxiliary charged independently until each of the plurality of batteries reaches an auxiliary charging state, and
wherein the processor is further configured to allow the plurality of batteries to have different cutoff time points and recharging time points, respectively wherein the processor is configured to: block cell balancing from occurring while each of the plurality of batteries is discharged before reaching auxiliary charging state.

10. The electronic device of claim 9, wherein the processor is configured to:
perform the auxiliary charging independently based on a remaining capacity of each of the plurality of batteries.

11. The electronic device of claim 9, wherein a full charging condition after the auxiliary charging is performed is substantially identical with a full charging condition at a start of charging.

12. An electronic device comprising:
a housing;
a plurality of batteries arranged in the housing;
a power management module configured to control the plurality of batteries;
a plurality of current limiting ICs configured to limit a maximum intensity of a current flowing into each of the plurality of batteries; and
a processor operationally connected to the plurality of batteries, the power management module and the plurality of current limiting ICs,
wherein the processor is configured to:
sense a voltage of each of the plurality of batteries,
select a voltage from the voltages of the plurality of batteries based on a first value that is a difference value between the voltages of the plurality of batteries and a second value that is a threshold voltage,
determine whether the selected voltage has a value less than an auxiliary charging voltage, and
perform auxiliary charging when the selected voltage is less than the auxiliary charging voltage.

13. The electronic device of claim 12, wherein the processor is configured to:
select a lower voltage among the voltages of the plurality of batteries when the first value is greater than the second value, and
select a higher voltage among the voltages of the plurality of batteries when the first value is less than the second value.

14. The electronic device of claim 12, wherein the processor is configured to:
determine an auxiliary charging time point based on a lowest voltage among the voltages of the plurality of batteries.

15. The electronic device of claim 12, wherein the processor is configured to:
immediately perform the auxiliary charging when the first value is greater than the second value.

16. The electronic device of claim 12, wherein the processor is configured to:
allow the plurality of batteries to simultaneously enter the auxiliary charging when the selected voltage has a value smaller than the auxiliary charging voltage.

17. The electronic device of claim 12, wherein the processor is configured to:
determine that a charging state is poor when an intensity of the current flowing into the plurality of batteries is greater than a specified value compared to an intensity of a current output from the power management module.

18. The electronic device of claim 12, wherein the processor is configured to:
sense a connection state, a deterioration state, or a connection failure of each of the plurality of batteries and notify a user.

* * * * *